Patented Mar. 29, 1932

1,851,038

UNITED STATES PATENT OFFICE

HORACE N. CLARK, OF BRIDGEWATER TOWNSHIP, SOMERSET COUNTY, NEW JERSEY, ASSIGNOR TO REFRACTORY AND ENGINEERING CORPORATION, OF NEW YORK, N. Y., A CORPORATION OF NEW JERSEY

INSULATING CEMENT

No Drawing.  Application filed January 7, 1931. Serial No. 507,304.

My invention relates to a cement of the heat insulating type and contemplates particularly the provision of a cement suitable for application to the outside of furnaces, boilers, hot pipes, and the like.

Considerable research work has been done in the past with various materials in an endeavor to evolve a cement capable of meeting the requirements necessary for proper heat insulation. This research has met with some measure of success, but up to the present no cement has been produced which will have sufficient resistance to heat, and which, at the same time, will be capable of resisting high pressure and will not crack on drying. The latter defect is the one most common in cements of this type.

It is the particular object of my invention to provide a heat insulating cement which will be cheap enough to be readily adopted by the art, will withstand high temperatures, will be capable of smooth application, will have high cohesive strength, and a great adhesive strength, and which will have a minimum amount of shrinkage upon drying. Since cracking is attributable directly to shrinkage, it follows that the tendency of my cement to crack upon drying will be reduced to a minimum.

Though in the prior art several of the ingredients of which my cement is composed have been tried in various combinations, they have not been combined in exactly the same way and in the same proportions in which I propose to combine them. The failure of workers in the art to combine all the ingredients which I use, in the proportions in which I use them, has been to a large extent responsible for the difficulty experienced in the production of a satisfactory cement, and has, in many cases, led to the conclusion that these ingredients are of no value in insulating cements.

The ingredients of which I propose to make my cement are mineral wool, asbestos, bentonite, and diatomaceous earth. As is well known, bentonite is one of the clays which has recently attained a prominent place in this art. It is possible to substitute rock wool for mineral wool in my cement, although the cement produced by the substitution is not quite as satisfactory as my preferred cement. The proportions in which I prefer to use these ingredients are as follows:

| | Per cent |
|---|---|
| Mineral wool | 55 |
| Diatomaceous earth | 20 |
| Bentonite | 15 |
| Asbestos fiber | 10 |

The peculiar thing about these proportions is that they cannot be varied to a very large extent without impairing the qualities of the cement to such an extent as to render it practically non-utilitarian. For example, a variation of the proportion of mineral wool of more than ten per cent on either side of the preferred proportion would be fatal to the operativeness of the cement. The bentonite cannot be varied more than 5% either way if a satisfactory cement is to be produced. The allowable variation in the proportion of the diatomaceous earth is about the same as that of the mineral wool. The preferred proportion of the asbestos cannot be decreased by more than 5%, although a more or less satisfactory cement is produced if there is up to a 10% increase over the preferred proportion of asbestos.

I have further found that the quality of the cement is considerably improved if the mineral wool is oiled during its manufacture. In other words, while a perfectly satisfactory cement can be obtained from mineral wool which has not been oiled, I prefer to use oiled mineral wool for the reason that when using the latter the cohesive strength of the cement is increased, and, at the same time, shrinkage on drying is decreased.

Taking into consideration what has been said above about the allowable variation in the proportions of the ingredients, it may be safely stated without exceeding the bounds of operativeness, that the range of proportions of the various ingredients is about as follows:

|  | Per cent |
|---|---|
| Oiled mineral wool | 45-65 |
| Diatomaceous earth | 10-30 |
| Bentonite | 11-18 |
| Asbestos | 5-20 |

As a natural corollary of the above discussion of the allowable variation of the proportions of the ingredients, it may be stated that all of the ingredients are indispensable. In other words, the omission of any one of the above enumerated ingredients would lead to an entirely different and an entirely unsatisfactory result.

Having thus described my invention and having given an example of the preferred embodiment of the same, together with the operative range of the proportions of the ingredients, what I claim as new and wish to secure by Letters Patent is:

1. A heat insulating cement comprising 45 to 65 parts of mineral wool, 10 to 30 parts of diatomaceous earth, 11 to 18 parts of bentonite, and 5 to 20 parts of asbestos.

2. A heat insulating cement comprising 45 to 65 parts of oiled mineral wool, 10 to 30 parts of diatomaceous earth, 11 to 18 parts of bentonite, and 5 to 20 parts of asbestos.

3. A heat insulating cement comprising 55 parts of mineral wool, 20 parts of diatomaceous earth, 15 parts of bentonite, and 10 parts of asbestos.

4. A heat insulating cement comprising 55 parts of oiled mineral wool, 20 parts of diatomaceous earth, and 15 parts of bentonite, and 10 parts of asbestos.

In testimony whereof I have hereunto set my hand.

HORACE N. CLARK.